(12) United States Patent
Vanderzon

(10) Patent No.: US 10,039,166 B2
(45) Date of Patent: Jul. 31, 2018

(54) DIMMER SYSTEM

(71) Applicant: Ozuno Holdings Limited, Tortola (VG)

(72) Inventor: James Vanderzon, MacDonald Park (AU)

(73) Assignee: Ozuno Holdings Limited, Tortola (VG)

( * ) Notice: Subject to any disclaimer, the term of this patent is extended or adjusted under 35 U.S.C. 154(b) by 0 days.

(21) Appl. No.: 15/580,994

(22) PCT Filed: Jun. 7, 2016

(86) PCT No.: PCT/AU2016/050457
§ 371 (c)(1),
(2) Date: Dec. 8, 2017

(87) PCT Pub. No.: WO2016/197188
PCT Pub. Date: Dec. 15, 2016

(65) Prior Publication Data
US 2018/0160494 A1   Jun. 7, 2018

(30) Foreign Application Priority Data

Jun. 9, 2015 (AU) ................................ 2015902150

(51) Int. Cl.
 *H05B 33/08*  (2006.01)
(52) U.S. Cl.
 CPC ..... *H05B 33/0845* (2013.01); *H05B 33/0809* (2013.01)

(58) Field of Classification Search
 None
 See application file for complete search history.

(56) References Cited

U.S. PATENT DOCUMENTS

| | | | |
|---|---|---|---|
| 6,285,140 B1 * | 9/2001 | Ruxton | H05B 33/0803 315/291 |
| 7,566,996 B2 * | 7/2009 | Altonen | G06F 3/03547 200/514 |
| 7,847,440 B2 * | 12/2010 | Mosebrook | H05B 37/0209 307/115 |
| 9,000,680 B2 * | 4/2015 | Melanson | H05B 33/0809 315/291 |
| 9,084,310 B2 * | 7/2015 | Bedell | H05B 37/0227 |

(Continued)

*Primary Examiner* — Crystal L Hammond
(74) *Attorney, Agent, or Firm* — The Webb Law Firm

(57) ABSTRACT

Dimming system with parallel dimmers each with user interface and dimmer circuit are connected in series with a load and AC source. AC switch in dimmer circuit switches AC to the load at a conduction angle, the AC conducted in ON state and not OFF state; a controller determines the conduction angle to control turn-ON at each half cycle to control switching of ON and OFF states based on user control signal; controller detects zero-crossing of the AC and track conduction angle by detecting change in conduction angle based on zero-crossing of the AC. If the controller of an initiating dimmer determines a new conduction angle based on user signal this controller uses the new conduction angle. The controller of each dimmer except the initiating one detects a change in the conduction angle of the load in response to the new angle and the controller of each dimmer except the initiating one adopts that angle.

26 Claims, 6 Drawing Sheets

(56) References Cited

U.S. PATENT DOCUMENTS

| | | | | |
|---|---|---|---|---|
| 9,184,661 B2* | 11/2015 | Melanson | .............. | H02M 3/335 |
| 9,655,219 B2* | 5/2017 | Chen | .................... | H05B 39/044 |
| 9,736,911 B2* | 8/2017 | Taipale | .............. | H05B 37/0263 |
| RE46,586 E * | 10/2017 | Steiner | | |
| 9,906,153 B2* | 2/2018 | Chen | .................. | H02M 5/2573 |
| 2007/0296347 A1* | 12/2007 | Mosebrook | ........ | H05B 37/0209 |
| | | | | 315/209 SC |
| 2009/0195168 A1* | 8/2009 | Greenfeld | .......... | H05B 33/0815 |
| | | | | 315/192 |
| 2012/0230073 A1* | 9/2012 | Newman, Jr. | ...... | H05B 33/0815 |
| | | | | 363/126 |
| 2013/0162168 A1* | 6/2013 | Ostrovsky | .......... | H05B 33/0815 |
| | | | | 315/287 |
| 2013/0170263 A1* | 7/2013 | Newman, Jr. | ........... | H02M 7/06 |
| | | | | 363/126 |
| 2013/0181630 A1* | 7/2013 | Taipale | .............. | H05B 37/0263 |
| | | | | 315/224 |
| 2013/0257406 A1* | 10/2013 | Hausman, Jr. | ............ | G05F 5/00 |
| | | | | 323/300 |
| 2014/0077718 A1* | 3/2014 | Zotter | ................ | H05B 33/0815 |
| | | | | 315/224 |
| 2014/0265880 A1* | 9/2014 | Taipale | .............. | H05B 37/0263 |
| | | | | 315/158 |
| 2015/0171762 A1* | 6/2015 | Chen | .................. | H05B 33/0815 |
| | | | | 323/311 |
| 2015/0319818 A1* | 11/2015 | Kahlman | ........... | H05B 37/0209 |
| | | | | 315/201 |
| 2016/0095187 A1* | 3/2016 | Chen | .................... | H05B 39/044 |
| | | | | 315/155 |

* cited by examiner

DIMMER SYSTEM

CROSS-REFERENCE TO RELATED APPLICATION

This application is a National Stage Application under 35 U.S.C. § 371 of PCT/AU2016/050457 filed Jun. 7, 2016 that claims the benefit of Australia Patent Application No. 2015902150 filed Jun. 9, 2015. The disclosure of the foregoing applications are hereby incorporated by reference in their entirety.

RELATED APPLICATION

This application claims priority from Australian Provisional Patent Application No. 2015902150 filed on 9 Jun. 2015, the contents of which are to be taken as incorporated herein by this reference.

TECHNICAL FIELD

The present invention relates to a dimmer system for controlling AC power to a load. In particular, but not exclusively, the present invention relates to a dimmer system including a plurality of multi-way dimmers for controlling a load such as a driver for an LED light source.

BACKGROUND OF INVENTION

Dimmers typically include a dimmer circuit and a user interface (e.g. a rotary knob) to control power, in particular alternating current (AC) mains power, to a load, such as a light source. In one existing example of a dimmer, a light source can be dimmed using a phase controlled dimmer, whereby power provided to the load is controlled by varying the amount of time that a switch connecting the load to a mains power source is conducting during a cycle of the AC (e.g. varying the duty cycle). Specifically, in this example, AC power to the load is switched ON and OFF during each half cycle of alternating current and the amount of dimming of the load is provided by the amount of ON time in relation to the OFF time for each half cycle.

Phase control dimmer circuits generally operate as trailing edge or leading edge dimmer circuits, and the two circuits are suited to different applications. In leading edge circuits, power is switched OFF at the beginning of each half cycle. In trailing edge circuits, power is switched OFF later in each half cycle (e.g. towards the end of each half cycle). Leading edge dimmer circuits are generally better suited to controlling power to inductive loads, such as small fan motors and iron core low voltage lighting transformers. Trailing edge dimmer circuits, on the other hand, are generally better suited to controlling power to capacitive loads, such as drivers for Light Emitting Diode (LED) lights.

In some applications, a dimmer system including more than one user interface for a dimmer is employed to control a load. For example, in a room with multiple entry ways, multiple user interfaces at each of the entry ways communicate with a central dimmer to control the load which is say an LED light source for the room. Existing examples of dimmer systems with multiple inputs include variations of a dimmer system with a central master dimmer controlling the light source and multiple slave dimmer inputs. More specifically, the central master dimmer is a phase control dimmer and the multiple slave dimmer inputs simply remotely control the central dimmer via some type of communication means. In these existing examples, however, the central dimmer requires an additional input for the additional signalling between the slave dimmer inputs and the master dimmer. The additional input may be, for instance, a radio frequency (RF) input for transmitting/receiving RF dimmer control signals or an extra low voltage wire input for transmitting/receiving dimmer control signals over an extra low voltage bus control system.

SUMMARY OF INVENTION

Accordingly, in one aspect of the present invention, there is provided a dimming system for controlling a load, the dimming system including: a plurality of dimmers connected in series with the load and an alternating current (AC) source, whereby each of the plurality of dimmers are connected in parallel with each other, wherein each of the plurality of dimmers has a user interface and a dimmer circuit for controlling AC to the load, and wherein the dimmer circuit includes: an AC switch for switching the AC to the load at a conduction angle to control the load, whereby the AC is conducted to the load in an ON state and not conducted to the load in an OFF state; and a controller configured to: determine the conduction angle of the load to control turn-ON at each half cycle of the AC source to control switching of the ON and OFF states of the AC switch based on at least a user control signal from the user interface indicating the conduction angle of the load; detect a zero-crossing of the AC to the load; and track the conduction angle of the load by detecting change in the conduction angle of the load based on the zero-crossing of the AC to the load, and wherein if the controller of an initiating one of the plurality of dimmers determines a new conduction angle of the load based on the user control signal, the controller of the initiating one of the dimmers uses the new conduction angle, the controller of each of the plurality of dimmers except the initiating one of the dimmers detects a change in the conduction angle of the load in response to the new conduction angle, and the controller of each of the plurality of dimmers except the initiating one of the dimmers adopts the new conduction angle.

Each of the plurality of dimmers except the initiating one of the dimmers thus relinquishes control of the load to the initiating one of the dimmers to provide multi-way control of the load. Preferably, the dimmers are all either leading edge phase control dimmers or are all trailing edge phase control dimmers. More preferably, the dimmers are 2-wire phase control dimmers. For example, the dimmer system includes a plurality of trailing edge phase control dimmers for controlling power to drivers for Light Emitting Diode (LED) lights.

In an embodiment, the dimmer circuit includes a microprocessor implementing the controller. In another embodiment, the controller includes at least one of a conduction angle control circuit configured to track the conduction angle of the load, a timing control circuit configured to determine the conduction angle of the load, and a zero-crossing detection circuit configured to detect the zero-crossing of the AC to the load. It will be appreciated by those persons skilled in the art, however, that the dimmer circuit could have any combination of these circuits being implemented by a microprocessor or by analogue circuits. In any case, the controller, or a combination of these circuits, is configured to determine conduction periods indicative of the AC being conducted to the load and non-conduction periods indicative of the AC not being conducted to the load using the zero-crossing of the AC to the load. The controller can also be further configured to track the conduction angle of the load by detecting change in the conduction angle of the load based on the conduction periods and the non-conduction periods of the AC to the load. Also, the controller can be further configured to determine the conduction angle of the load to control turn-OFF at each half cycle of the AC source in addition to turn-ON.

In an embodiment of the dimmer system in use, the initiating dimmer receives input by a user to reduce brightness of the LED lights. In this embodiment, the user control signal is a ramp down command, the controller of the initiating one of the plurality of dimmers determines the new conduction angle of the load to be a decrease in conduction angle, and the controller of the initiating one of the dimmers provides a dimmer control signal to each of the plurality of dimmers except the initiating one of the dimmers. Preferably, the dimmer control signal is provided for a designated signalling period before the controller of the initiating one of the dimmers adopts the new conduction angle. In one embodiment, the dimmer control signal includes a momentary increase in the conduction angle of the load for the designated signalling period. In another embodiment, the dimmer control signal includes information to be received by the non-initiating dimmers in the non-conduction periods for the designated signalling period.

In the embodiment where the controller includes the timing control, zero-crossing detection and conduction angle control circuits, and the dimmer control signal is a momentary increase in the conduction angle of the load, the timing control circuit of the initiating one of the plurality of dimmers determines the new conduction angle of the load to be a decrease in conduction angle, and the conduction angle control circuit of the initiating one of the dimmers momentarily increases the conduction angle of the load for the designated signalling period before adopting the new conduction angle. The conduction angle control circuit of each of the plurality of dimmers except the initiating one of the dimmers then detects the momentarily increase in the conduction angle and the timing control circuit of each of the plurality of dimmers except the initiating one of the dimmers turns-OFF the AC switch until the conduction angle control circuit determines the new conduction angle caused by the initiating one of the dimmers based on the conduction periods and the non-conduction periods of the AC, and the timing control circuit of each of the plurality of dimmers except the initiating one of the dimmers adopts the new conduction angle for the respective AC switch.

In another embodiment of the dimmer system in use, the initiating dimmer receives input by a user to increase brightness of the LED lights. In this embodiment, the user control signal is a ramp up command, and the timing control circuit of the initiating one of the plurality of dimmers determines the new conduction angle of the load to be an increase in conduction angle, and the conduction angle control circuit of the initiating one of the dimmers monotonically increases the conduction angle of the load until reaching the new conduction angle. The conduction angle control circuit of each of the dimmers except the initiating one of the dimmers then detects the increase in the conduction angle, and the timing control circuit of each of the plurality of dimmers except the initiating one of the dimmers adopts the new conduction angle. In the embodiment, the conduction angle control circuit of each of the dimmers except the initiating one of the dimmers ramps up the conduction angle of the respective AC switch until substantially reaching the new conduction angle. It will be appreciated by those persons skilled in the art that substantially reaching the new conduction angle is reaching the new conduction angle within a predetermined margin, such as 1-2% of half-cycle period.

It will also be appreciated that each of the dimmers have a dimmer conduction angle and that the conduction angle control circuit of each of the dimmers except the initiating one of the dimmers ramps up the dimmer conduction angle of the respective AC switch until substantially reaching the new conduction angle of the load. Alternatively, when the new conduction angle of the load is a decrease in conduction angle, the conduction angle control circuit of each of the dimmers except the initiating one of the dimmers ramps up the dimmer conduction angle of the respective AC switch from the OFF-state until substantially reaching the new conduction angle of the load.

In yet another embodiment of the dimmer system in use, the initiating dimmer receives input by a user to turn-OFF the LED lights. In this embodiment, the user control signal is a turn-OFF dimmer command, the timing control circuit of the initiating one of the plurality of dimmers determines the new conduction angle of the load to be a decrease in conduction angle to zero, and the conduction angle control circuit of the initiating one of the dimmers momentarily increases the conduction angle for the designated signalling period before adopting the new conduction angle of zero.

Preferably, the designated signalling is between 30 ms and 300 ms (e.g. 100 ms). It will be appreciated by those persons skilled in the art that the lower limit of the designated signalling period is determined by noise immunity considerations of the dimmer circuit and upper limit of the designated signalling period is determined by user response time acceptability of a dimmer for, say, the LED light. It will further be appreciated that the upper limit is determined by whether an increase in brightness is perceivable and considered undesirable by a user of the LED light.

In an embodiment where the conduction angle of the initiating one of the dimmers is at a maximum conduction angle and the new conduction angle is a decrease, the conduction angle control circuit of the initiating one of the dimmers momentarily increases the conduction angle of the load for the designated signalling period beyond the maximum conduction angle of the initiating one of the dimmers before adopting the new conduction angle of the load.

In an embodiment of a dimmer circuit, the timing control circuit further includes a switching circuit for controlling delivery of the AC to the load by conducting power to the load in the ON state and not conducting power to the load in the OFF state and a switching control circuit for controlling turn-OFF and turn-ON of the switching circuit at each cycle of the AC to control switching of the ON and OFF states of the switching circuit. Also, the dimming circuit further includes a rectifier for rectifying the AC in the non-conduction period to generate rectified dimmer voltage to be provided to the dimmer circuit.

In another aspect of the present invention, there is provided a method of controlling a load connected in series with an alternating current (AC) source and a plurality of dimmers for controlling AC to the load, whereby each of the plurality of dimmers are connected in parallel with each other, the method includes: receiving a user control signal from an initiating one of the plurality of dimmers intending to change a conduction angle of the load to a new conduction angle; determining the new conduction angle of the load based on the user control signal to control turn-ON at each half cycle of the AC source; switching the AC to the load at the new conduction angle to control the load at the initiating one of the plurality of dimmers, whereby the AC is conducted to the load in an ON state and not conducted to the load in an OFF state; detecting a zero-crossing of the AC to the load; tracking the conduction angle of the load by detecting change in the conduction angle of the load based on the zero-crossing of the AC to the load at each of the plurality of dimmers except the initiating one of the dimmers in response to the new conduction angle; and adopting the new conduction angle at each of the plurality of dimmers except the initiating one of the dimmers.

In another aspect of the present invention, there is provided a dimming system for controlling a load, the dimming system including: a plurality of dimmers connected in series with the load and an alternating current (AC) source, whereby each of the plurality of dimmers are connected in parallel with each other, wherein each of the plurality of dimmers has a user interface and a dimmer circuit for controlling AC to the load, and wherein the dimmer circuit includes: an AC switch for switching the AC to the load at a conduction angle to control the load, whereby the AC is conducted to the load in an ON state and not conducted to the load in an OFF state; and a controller configured to: determine the conduction angle of the load to control turn-ON at each half cycle of the AC source to control switching of the ON and OFF states of the AC switch based on at least a user control signal from the user interface indicating the conduction angle of the load; detect a zero-crossing of the AC to the load; and track the conduction angle of the load by detecting change in the conduction angle of the load based on the zero-crossing of the AC to the load, and wherein if the controller of an initiating one of the plurality of dimmers determines a new conduction angle of the load based on the user control signal, the controller of the initiating one of the dimmers uses the new conduction angle, the controller of each of the plurality of dimmers except the initiating one of the dimmers detects a change in the conduction angle of the load in response to the new conduction angle, and the controller of each of the plurality of dimmers except the initiating one of the dimmers turns-OFF the respective AC switch In this aspect, each of the plurality of dimmers except the initiating one of the dimmers also relinquishes control of the load to the initiating one of the dimmers to provide multi-way control of the load by turning OFF. In both aspects, to turn-ON a dimmer of the plurality of dimmers, a turn-ON command is received from the user interface. Alternatively, the conduction angle control circuit of each of the plurality of dimmers except the initiating one of the dimmers detects a conduction angle in response to the new conduction angle to be, say, greater than 10%. In this embodiment, the timing control circuit of each of the plurality of dimmers except the initiating one of the dimmers also adopts the new conduction angle.

In yet another aspect of the invention, there is provided a dimming system for controlling a load, the dimming system including: a plurality of dimmers connected in series with the load and an alternating current (AC) source, whereby each of the plurality of dimmers are connected in parallel with each other, wherein each of the plurality of dimmers has a user interface and a dimmer circuit for controlling AC to the load, and wherein the dimmer circuit includes: an AC switch for switching the AC to the load at a conduction angle to control the load, whereby the AC is conducted to the load in an ON state and not conducted to the load in an OFF state; and a controller configured to: determine the conduction angle of the load to control turn-ON at each half cycle of the AC source to control switching of the ON and OFF states of the AC switch based on at least a user control signal from the user interface indicating the conduction angle of the load; detect a zero-crossing of the AC to the load; and track the conduction angle of the load by detecting change in the conduction angle of the load based on the zero-crossing of the AC to the load, and wherein if the controller of an initiating one of the plurality of dimmers determines a new conduction angle of the load based on the user control signal, the controller of the initiating one of the dimmers uses the new conduction angle, the controller of each of the plurality of dimmers except the initiating one of the dimmers detects a change in voltage at the plurality of dimmers except the initiating one of the dimmers in response to the new conduction angle, and the controller of each of the plurality of dimmers except the initiating one of the dimmers adopts the new conduction angle.

In this aspect, if the user control signal is a ramp down command, the controller of the initiating one of the plurality of dimmers determines the new conduction angle of the load to be a decrease in conduction angle, and the controller of the initiating one of the dimmers provides a dimmer control signal for a designated signalling period to each of the plurality of dimmers except the initiating one of the dimmers. For example, the dimmer control signal includes a momentary increase in the conduction angle of the load for the designated signalling period, and the controller of each of the plurality of dimmers except the initiating one of the dimmers detects the change in voltage as a decrease in voltage at the plurality of dimmers except the initiating one of the dimmers for the designated signalling period.

Also, if the user control signal is a ramp up command, the controller of the initiating one of the plurality of dimmers determines the new conduction angle of the load to be an increase in conduction angle, and the controller of the initiating one of the dimmers monotonically increases the conduction angle of the load until reaching the new conduction angle. The controller of each of the dimmers except the initiating one of the dimmers then detects the change in voltage as a decrease in voltage at the plurality of dimmers except the initiating one of the dimmers, and adopts the new conduction angle.

That is, in this aspect, where an initiator dimmer increases the prevailing load conduction angle, all non-initiator dimmers are able to detect a resulting decrease in voltage across their respective dimmer line and load terminals. Also, where an initiator dimmer intends to decrease the prevailing load conduction angle, it first momentarily increases the load conduction angle—as a signalling means to all non-initiator dimmers to cause them to temporarily revert to OFF-state—detectable by a momentary decrease in dimmer terminal voltage, then decreases the load conduction angle to the new value. In either case, the non-initiator dimmers finally track the conduction angle of the initiator dimmer by monitoring the duty-cycle of their zero-crossing signal. Thus, in this aspect, for instance, the controller is configured to track the angle as previously described—monitoring of duty-cycle of zero-crossing signal of the AC—and the signalling means remains as a momentary increase in load conduction angle—however in this case is detected as a reduction in dimmer terminal voltage instead of detecting a change in conduction angle of the load as per the above aspects.

BRIEF DESCRIPTION OF DRAWINGS

Embodiments of the present invention will now be described, by way of example only, with reference to the accompanying drawings, in which.

DETAILED DESCRIPTION

Figure 1:
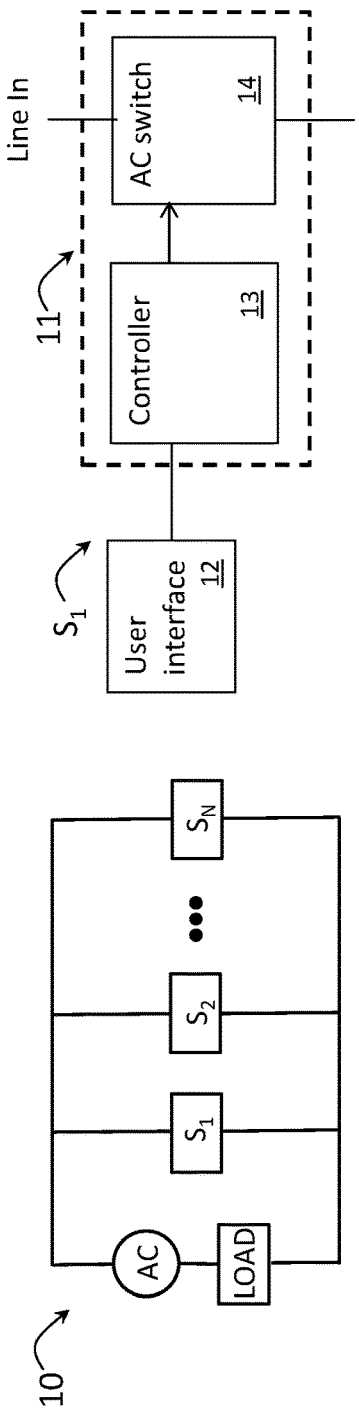
FIG. 1 shows a dimmer system for controlling a load according to an embodiment of the present invention.

FIG. 1 shows an embodiment of a dimmer system 10 for controlling a load having a plurality of dimmers $S_1$-$S_N$, whereby each of the plurality of dimmers $S_1$-$S_N$ are connected in parallel with each other and the plurality of dimmers $S_1$-$S_N$ are connected in series with the load and an alternating current (AC) source. As discussed, the load is preferably a driver for LED lights and the user controls brightness of the LED lights using each of the multi-way dimmers $S_1$-$S_N$. Also, the dimmers are preferably trailing edge phase control dimmers for controlling the LED lights.

Figure 2A:
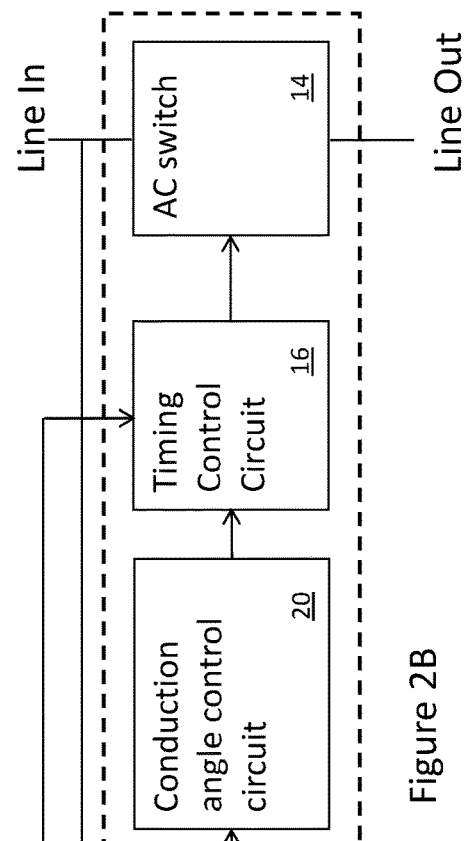
FIG. 2A shows a block diagram of a dimmer of the dimmer system of FIG. 1.

FIG. 2A shows an embodiment of one of the dimmers $S_1$ in more detail, which has a dimmer circuit 11 for controlling alternating current (AC) to the load. The dimmer $S_1$ also has a user interface 12 for a user to control the brightness of the load. Further, as discussed, it will be appreciated by those persons skilled in the art that the dimmer system of FIG. 1 could be representative of a room with multiple entry ways and each of the dimmers $S_1$-$S_N$ are multi-way dimmers that allow a user to control brightness of the LED lights in the room independently from each of the dimmers at the entry ways. The dimmer circuit 11 includes a the dimmer circuit 11 includes a controller 13 configured to perform a number of steps to implement control of the load by controlling an AC switch 14.

Figure 2B:
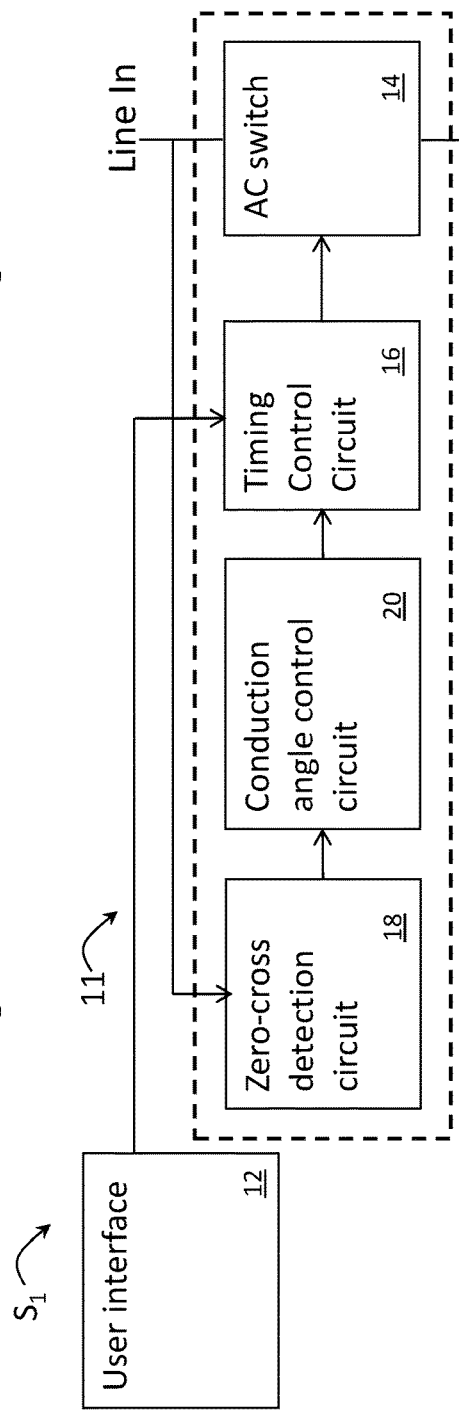
FIG. 2B shows a block diagram of a dimmer of the dimmer system of FIG. 1.

FIG. 2B shows a further embodiment of one of the dimmers $S_1$ in more detail, which has a dimmer circuit 11 for controlling alternating current (AC) to the load. The dimmer $S_1$ also has a user interface 12 for a user to control the brightness of the load. Preferably, the dimmers $S_1$-$S_N$ are 2-wire trailing edge phase control dimmers for controlling brightness of a light source, such as a LED light source. It will be appreciated by those persons skilled in the art that N can be any number of dimmer wired in parallel, with N being limited by the light source load not illuminating due to the combined OFF state leakage current of the N dimmers. It will also be appreciated that the load can be an inductive, capacitive or resistive load. In one embodiment, for instance, the load is a driver for Light Emitting Diode (LED) lights and is a capacitive load. In another embodiment, the dimmers $S_1$-$S_N$ are 2-wire leading edge phase control dimmers and the load is inductive. In yet another embodiment, the load is an incandescent lamp and is a resistive load; in this embodiment, either all leading or all trailing edge phase control dimmers are suitable.

In the embodiment of FIG. 2B, the dimmer circuit 11 includes a number of further circuits rather than the controller 13 to implement control of the load. It will be appreciated by those persons skilled in the art that many circuits of the dimmer circuit 11 do not affect operation of the multi-way dimmer system and thus will not be discussed in detail herein. The circuits of the dimmer circuit 11 that affect operation include an AC switch 14 for switching the AC to the load at a conduction angle to control the load. The AC switch 14 applies line voltage to the load only during a selected conduction period within each polarity of AC voltage half-cycle. That is, the AC is conducted to the load in an ON state and not conducted to the load in an OFF state and the ON state is a conduction period and the OFF state is a non-conduction period.

The dimmer control circuit 11 also includes a timing control circuit 16 configured to determine the conduction angle of load to control turn-OFF and turn-ON at each cycle of the AC to control switching of the ON and OFF states of the AC switch 14. The timing control circuit 16 determines the conduction angle of the load based on at least a user control signal from the user interface 12 indicating the conduction angle of the load. For example, the user interface 12 is a rotary knob of a dimmer connected to a rotary encoder. The rotary encoder provides the user control signal in response to the user rotating the knob of the dimmer to arrive at a desired brightness of the light source.

The dimmer circuit 11 further includes a zero-cross detection circuit 18 configured to detect a zero-crossing of the AC and a conduction angle control circuit 20. The zero-crossing of the AC is used by the conduction angle control circuit 20 to determine the conduction periods and the non-conduction periods of the AC. The zero-cross detection circuit 18 thus provide an instantaneous timing indication of line voltage zero-crossing in each AC voltage half-cycle. The conduction angle control circuit 20 is subsequently configured to track the conduction angle of the load by detecting a change in the conduction angle of the load based on the conduction periods and the non-conduction periods of the AC. The zero-crossing of the AC occurs when the AC line voltage equals zero between the two polarities of the half cycles. In the multi-way dimmer system 10, for all non-initiator dimmers—whether in the ON-state or OFF-state—their respective zero-cross detection circuits 18 provide an indication of the prevailing conduction angle of a present initiator dimmer.

The dimmer circuit 11 also includes a rectifier (not shown) for rectifying the AC power in the non-conduction period to generate rectified dimmer voltage to be provided to the dimmer circuit 11. Also, the timing control circuit 16 of the dimmer circuit 11 has two circuits: a gate drive circuit (not shown) and a conduction period timing circuit (not shown). The gate drive circuit has a number of further circuits for controlling turn-OFF and turn-ON of the AC switch 14 at each half cycle of the AC to control switching of the ON and OFF states. The rectifier and the gate drive and conduction period timing circuits may adopt various configurations known in the art without affecting the working of the multi-way dimming system 10 other than providing voltage to the dimmer circuit 11 and thus will not be further discussed.

In use of the system 10, if the timing control circuit 16 of an initiating one of the plurality of dimmers $S_1$ determines a new conduction angle of the load based on a user control signal, the timing control circuit 16 of the dimmer $S_1$ uses the new conduction angle, which subsequently affects the zero-crossing of the AC for the load. Accordingly, the zero-cross detection circuit 18 of each of the plurality of dimmers $S_2$-$S_N$ except the initiating dimmer $S_1$ detects a change in the zero-crossing of the AC in response to the new conduction angle. The corresponding conduction angle control circuit 20 of the dimmers $S_2$-$S_N$ tracks this new conduction angle by detecting the change in the conduction angle of the load and, in one embodiment, the timing control circuit 16 of each the dimmers $S_2$-$S_N$ adopts the new conduction angle. In another embodiment, each of the plurality of dimmers $S_2$-$S_N$ turns-OFF AC to the AC switch 14 and thus relinquishes control to the initiating dimmer $S_1$ by turning OFF. That is, in both embodiments, the non-initiating dimmers $S_2$-$S_N$ relinquish control to the initiating dimmer by either adopting the new conduction angle or simply turning OFF.

With reference to the flow chart of FIG. 7, all of the dimmers $S_1$-$S_N$ in the system 10 of FIG. 1 are in the OFF-state and an initiating dimmer $S_1$ receives a turn-ON command as a user command signal from its user interface and the user subsequently inputs a desired load conduction angle of the load using the user interface. If the desired load conduction angle is greater than 10% then the non-initiating dimmers $S_2$-$S_N$ in the system 10 track the conduction angle of the load as described above and, in one embodiment, adopt the new, desired conduction angle.

Figure 7:
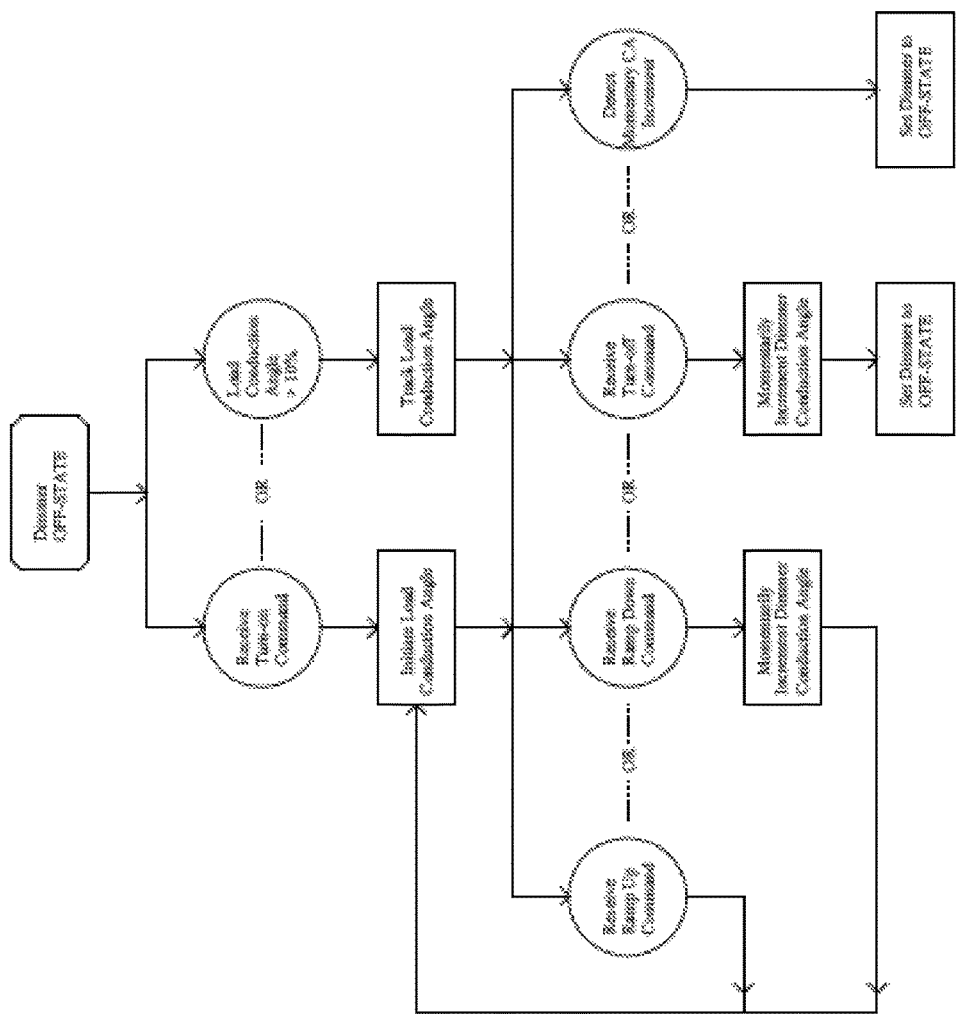
FIG. 7 is a flowchart of the dimmer system of FIG. 1.

It can be seen from FIG. 7 that the dimmers $S_1$-$S_N$ in the system 10 can also receive ramp up command to increase brightness of the load, ramp down command to decrease brightness of the load, and a turn-OFF command to turn-OFF AC power to the load. Accordingly, if the user inputs a ramp down command, the timing control circuit 16 of the initiating dimmer $S_1$ determines the new conduction angle of the load to be a decrease in conduction angle, and the conduction angle control circuit 20 of the initiating dimmer $S_1$ momentarily increases the conduction angle of the load for a designated signalling period before adopting the new conduction angle. The conduction angle control circuit 20 of each of the non-initiating dimmers $S_2$-$S_N$ then detects the momentarily increase in the conduction angle and the timing control circuit 16 of each of the plurality of dimmers except the initiating one of the dimmers turns-OFF the AC to the AC switch until the conduction angle control circuit 20 determines the new conduction angle caused by the initiating dimmer $S_1$ based on the conduction periods and the non-conduction periods of the AC. That is, the non-initiating dimmers $S_2$-$S_N$ track the conduction angle of the load even when in the OFF-state, and the timing control circuit of each of the plurality of dimmers adopts the new conduction angle for the respective AC switch at some time after the designated signalling period.

More specifically, the initiating dimmer $S_1$ required to decrease the prevailing load conduction angle, first momentarily increases its own conduction angle to exceed that which exists currently, by a predetermined conduction angle e.g. 1-2% of half-cycle period, as a means to signal to any parallel non-initiator dimmers $S_2$-$S_N$ that they must temporarily relinquish control to the new initiating dimmer $S_1$—that is, turn-OFF—while the initiating dimmer $S_1$ proceeds to reduce its own conduction angle according to the desired setting determined by the user interface 12 of the initiator dimmer $S_1$.

The dimmers $S_1$-$S_N$ in the system 10 can also receive a ramp up command, as shown in FIG. 7, to increase brightness of the load. If the user inputs a ramp up command at the initiating dimmer $S_1$ to increase brightness of the LED lights, the timing control circuit 16 of the initiating dimmer $S_1$ determines the new conduction angle of the load to be an increase in conduction angle, and the conduction angle control circuit 20 of the initiating dimmer $S_1$ monotonically increases the conduction angle of the load until reaching the new conduction angle. That is, conduction angle is incrementally increased at designated intervals until reaching the new conduction angle.

The conduction angle control circuit 20 of each of the non-initiating dimmers S2-$S_N$ then detects the increase in the conduction angle—which is sustained over a longer period than the designated signalling period—and the timing control circuit 16 of the dimmers $S_2$-$S_N$ adopts the new conduction angle. More specifically, the conduction angle control circuit 20 of the dimmers $S_2$-$S_N$ ramps up the conduction angle of the respective AC switch until substantially reaching the new conduction angle. As above, substantially reaching the new conduction angle includes reaching the new conduction angle within a predetermined margin, such as 1-2% of half-cycle period.

In the case where the initiating dimmer $S_1$ receives input by a user to turn-OFF the LED lights, the user control signal is a turn-OFF dimmer command and the timing control circuit 16 of the initiating dimmer $S_1$ determines the new conduction angle of the load to be a decrease in conduction angle to zero. Accordingly, the conduction angle control circuit 20 of the initiating dimmer momentarily increases the conduction angle for the designated signalling period, as above, so that the non-initiating dimmers $S_2$-$S_N$ temporarily turn-OFF and relinquish control before adopting the new conduction angle of zero. The non-initiating dimmers $S_2$-$S_N$ track the conduction angle of the load to zero, as above, and then adopt the conduction angle of zero and also turn-OFF.

Figures 3, 4:
FIG. 3 shows signals of a dimmer system for controlling a load according to an embodiment of the present invention where the load is a resistive load.
FIG. 4 shows signals of a dimmer system for controlling a load according to an embodiment of the present invention where the load is a capacitive load.

FIGS. 3 and 4 show signals of the dimmer system 10 for controlling a load where the load is a resistive load and capacitive load, respectively. Specifically, FIGS. 3 and 4 illustrate example waveforms associated with the dimmer system 10 where the dimmers are trailing edge phase control multi-way dimmers. In FIG. 3, the load is a resistive load and the Initiator Voltage Transition signal illustrates the relatively fast rise in instantaneous voltage across initiator dimmer $S_1$ at the end of half-cycle load conduction period. The Load Current Transition signal illustrates the relatively fast fall in instantaneous load current at the end of half-cycle load conduction period. The ZC signal depicts the output of the zero-cross detection circuit 16 of the dimmer $S_1$ relative to load current transition at the end of half-cycle load conduction period. The Initiator Dimmer Gate Drive signal depicts the initiator dimmer $S_1$ gate drive signal relative to the dimmer S1 zero-cross signal, indicative of initiator dimmer MOSFET turn-off delay. As described, the gate drive circuit is not shown and includes a number of further circuits for controlling turn-OFF and turn-ON of the AC switch 14 at each half cycle of the AC.

FIG. 3 also shows the Initiator Dimmer Current signal which depicts relative magnitude and timing of the initiator dimmer $S_1$ current compared to load current, using a predetermined tracking timing differential, at end of half-cycle load conduction period. The tracking timing differential indicates to the non-initiating dimmer timing control circuit 16 how close the dimmer conduction angle is to the load conduction angle—where load conduction angle is determined by the initiating dimmer. The Tracking Dimmer Gate Drive signal depicts required relative timing of the tracking/follower dimmer $S_2$-$S_N$ gate drive compared to the zero-cross signal. Finally, the Tracking Dimmer Current illustrates relative magnitude and timing of the tracking dimmer $S_2$-$S_N$ current in comparison to initiator dimmer current, at end of half-cycle load conduction period.

It will be appreciated by those persons skilled in the art that the timing control circuit 16, as shown in FIG. 2, includes switching elements, which are MOSFET switching devices. For example, the MOSFETs are high voltage (600V) N-channel MOSFETs (e.g. FCPF11N60), which are used to control the amount of power delivered to the load. Two of these MOSFETs are configured so that they alternately control power delivery to the load over the different polarity half cycles of AC power. That is, each of the MOSFETs turn-ON and turn-OFF the switching circuit 12 at each cycle of the AC, respectively, so that the load (e.g. a driver for LED down lights) is dimmed in proportion to the amount of time in each cycle that the AC switch 14 is switched OFF.

In FIG. 4, the load is a capacitive load and the Initiator Voltage Transition signal illustrates a relatively slow rise in instantaneous voltage across the initiator dimmer $S_1$ at the end of half-cycle load conduction period. The Load Current Transition signal illustrates the relatively fast fall in instantaneous load current at the end of half-cycle load conduction period. The ZC signal depicts an example of the additional delay time of dimmer zero-cross detection circuit 18 output timing relative to load current transition at end of half-cycle load conduction period. The Initiator Dimmer Gate Drive signal depicts the initiator dimmer $S_1$ gate drive signal relative to dimmer zero-cross signal, indicative of the initiator dimmer $S_1$ MOSFET turn-off delay added to zero-cross detector delay time. The Initiator Dimmer Current depicts relative magnitude and modified timing of the initiator dimmer $S_1$ current compared to load current, using a predetermined tracking timing differential, at end of half-cycle load conduction period.

FIG. 4 also shows the Tracking Dimmer Gate Drive signal depicting required relative timing of tracking/follower dimmer $S_2$-$S_N$ gate drive compared to dimmer zero-cross signal. The Tracking Dimmer Current signal illustrates relative magnitude and timing of tracking dimmer $S_2$-$S_N$ current in comparison to initiator dimmer $S_1$ current, at end of half-cycle load conduction period.

Figure 5:
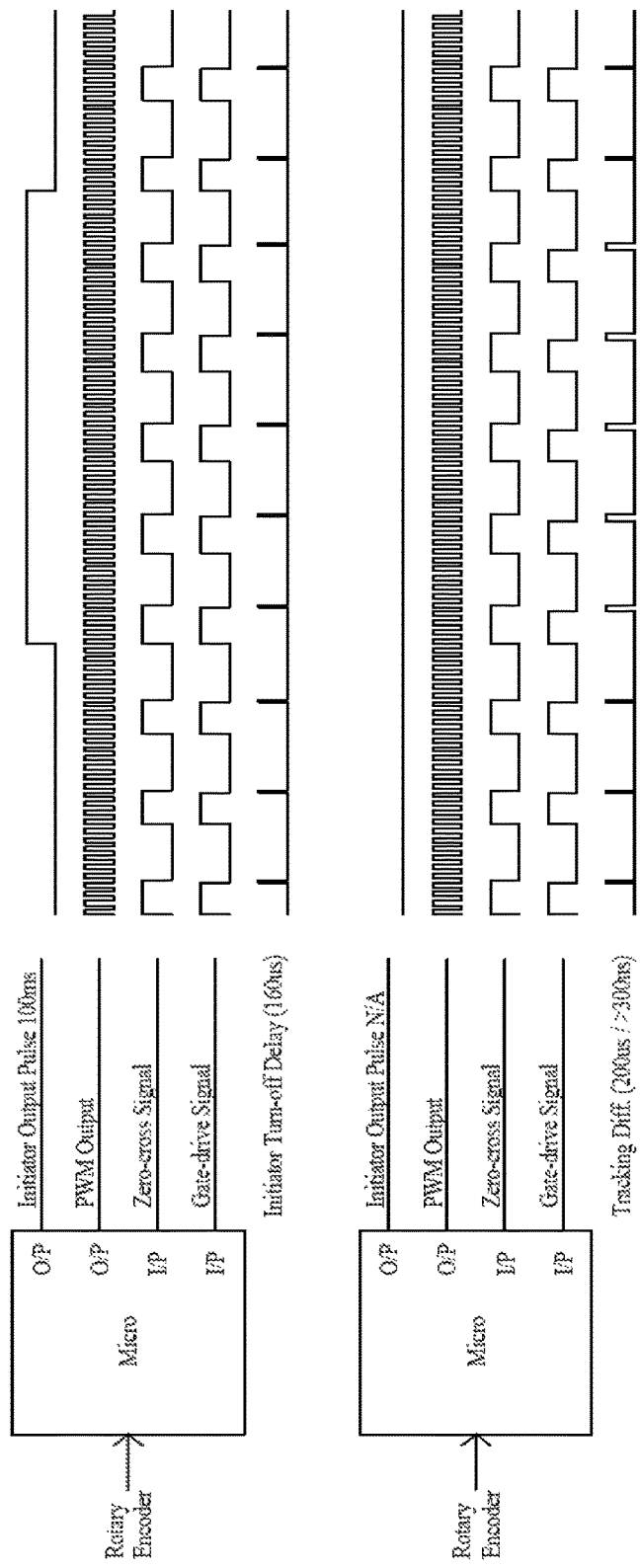
FIG. 5 shows signals of an initiation dimmer and a following dimmer of the dimmer system of FIG. 1.

FIG. 5 shows an example of microcontroller signals for the dimmers $S_1$-$S_N$ in the dimmer system 10. That is, in this example, each of the dimmers $S_1$-$S_N$ have a user interface in the form of a knob connected to a rotary encoder for generating the user command signals to permit adjustment of load conduction angle and a microprocessor implementing at least part of the dimmer circuit 11. The signals shown in FIG. 5 are based on a microcontroller with pulse with modulation (PWM) output signal, where the PWM duty-cycle determines the dimmer conduction angle.

When a decrease in load conduction angle is required, the initiator dimmer $S_1$ produces a nominal 100 ms initiator output pulse to initiate a momentary increase (increment) in conduction angle for a number of half-cycles. During the conduction angle designated signalling period, the duty-cycle of initiator dimmer gate drive signal increases to produce a corresponding increase in zero-cross signal duty-cycle, reflected as no change in the initiator dimmer turn-OFF delay. Also during the conduction angle designated signalling period, the duty-cycle of tracking dimmer gate drive signal remains constant, while the duty-cycle of zero-cross signal increases, reflected as an increase in tracking timing differential—thereby signalling the tracking dimmer to temporarily revert to OFF-state.

Figure 6:
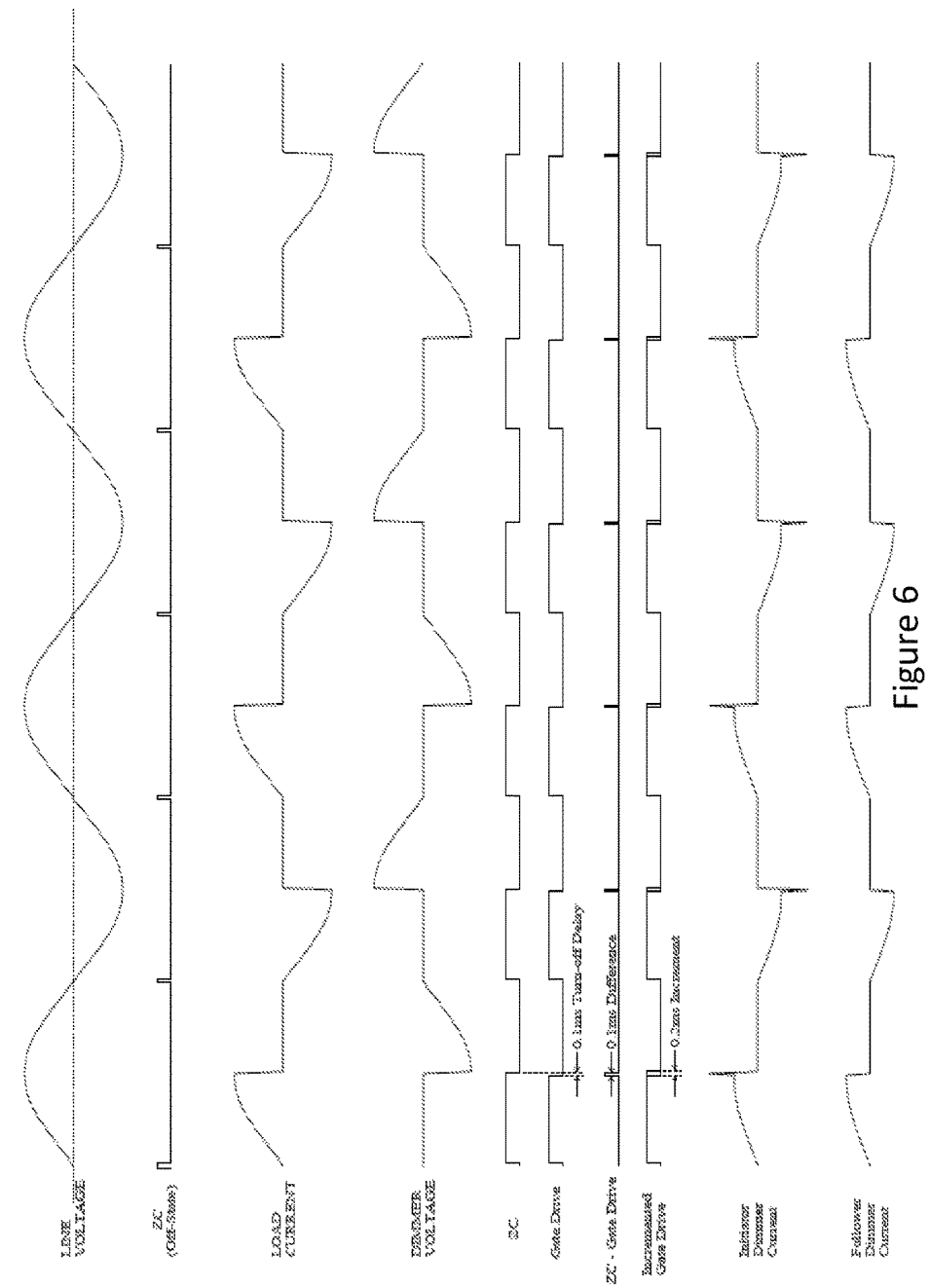
FIG. 6 shows waveforms of the dimmer system of FIG. 1.

FIG. 6 illustrates example waveforms associated with the dimmer system 10 where the dimmers are all trailing edge phase control multi-way dimmers. The Line voltage signal depicts sinusoidal nature of AC voltage. The ZC (Off-State) signal depicts low duty-cycle characteristic of dimmer zero-cross detection circuit 18 output when load conduction angle is zero—i.e. the load is in off-state. The Load current signal depicts an example of a load current waveform when load conduction angle is at 50% level. The Dimmer voltage signal depicts example of dimmer voltage waveform when load conduction angle is at 50% level. The ZC depicts dimmer zero-cross detection circuit 18 output when load conduction angle is at 50% level. The Gate Drive signal depicts relative timing of dimmer gate drive signal from conduction period timing circuit. The ZC—Gate Drive signal depicts the small timing difference between dimmer zero-cross detection circuit 18 and gate drive signal, which is associated with dimmer MOSFET effective turn-OFF delay (the time period between removal of gate drive and commencement of rise in MOSFET drain-source voltage). The Incremented Gate Drive signal depicts the small increment in gate drive duty-cycle, for a number of half-cycles, by an initiating dimmer $S_1$ intending to decrease the load conduction angle. At least for a follower one of the dimmers $S_2$-$S_N$, the designated signalling period needs to be greater in magnitude than the dimmer MOSFET effective turn-OFF delay, e.g. 100 ms. The Initiator Dimmer Current signal depicts an example of the initiator dimmer $S_1$ load current steady-state waveform when load conduction angle is at 50% level, noting that current magnitude is about half that of (where one parallel dimmer exists) load current excluding a short period at end of load conduction period where the initiator dimmer $S_1$ current is equal to load current. The Follower Dimmer Current depicts example of follower dimmer $S_2$-$S_N$ load current steady-state waveform when load conduction angle is at 50% level, noting that current magnitude is about half that of (where one parallel dimmer exists) load current excluding a short period at the end of load conduction period where the follower dimmer $S_2$-$S_N$ current falls to zero.

Figure 8:
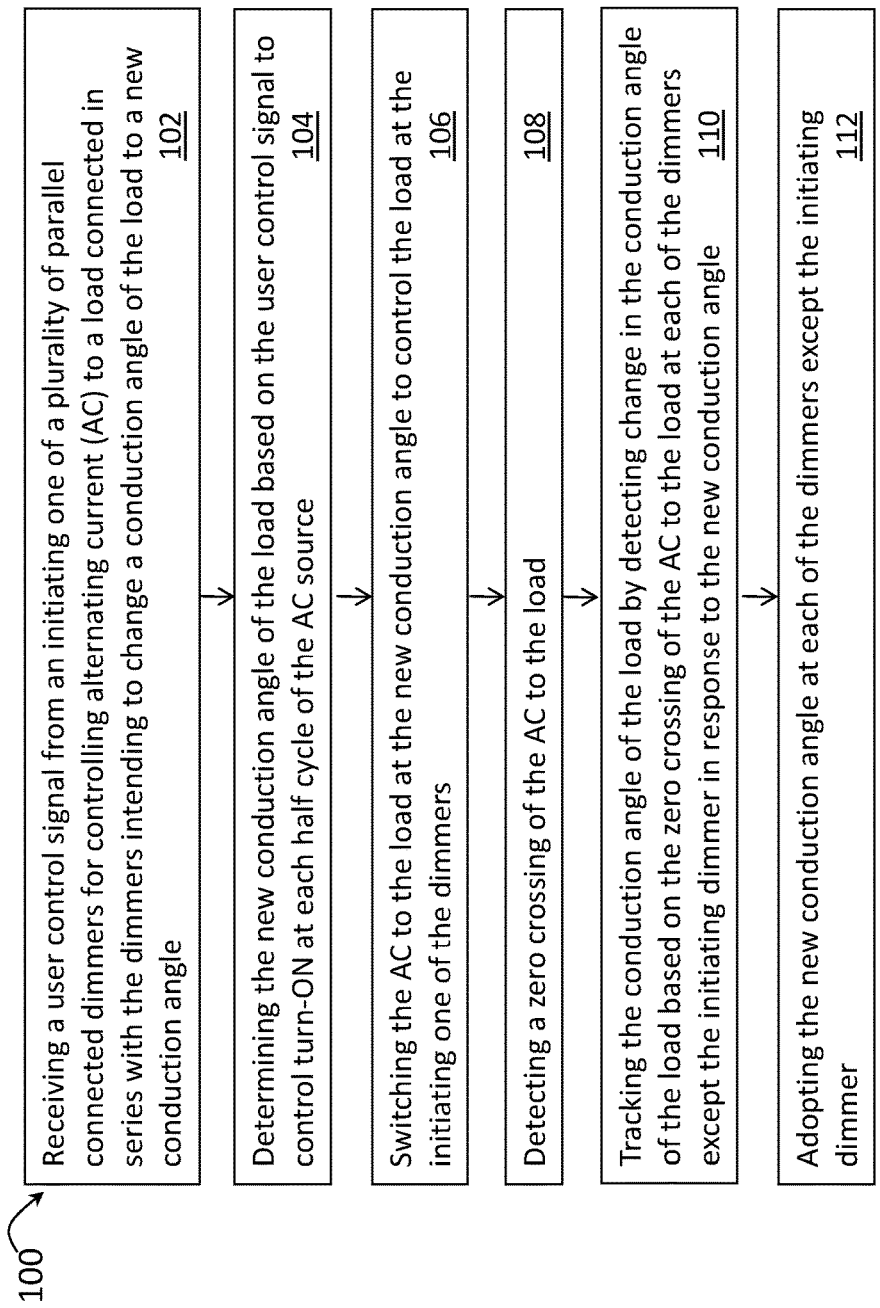
FIG. 8 is a flow chart of a method of controlling a load according to an embodiment of the present invention.

Referring now to FIG. 8, there is shown a summary of a method 100 of controlling a load connected in series with an alternating current (AC) source and a plurality of dimmers for controlling AC to the load, whereby each of the plurality of dimmers are connected in parallel with each other. The method 100 includes: receiving 102 a user control signal from an initiating one of the plurality of dimmers intending to change a conduction angle of the load to a new conduction angle; determining 104 the new conduction angle of the load based on the user control signal to control turn-ON at each half cycle of the AC source; switching 106 the AC to the load at the new conduction angle to control the load at the initiating one of the plurality of dimmers, whereby the AC is conducted to the load in an ON state and not conducted to the load in an OFF state; detecting 108 a zero-crossing of the AC to the load; tracking 110 the conduction angle of the load by detecting change in the conduction angle of the load based on the zero-crossing of the AC to the load at each of the plurality of dimmers except the initiating one of the dimmers in response to the new conduction angle; and adopting 112 the new conduction angle at each of the plurality of dimmers except the initiating one of the dimmers.

Further aspects of the method will be apparent from the above description of the dimming system 10. A person skilled in the art will also appreciate that at least parts of the method 100 could be embodied in program code for implementation on the above mentioned microprocessor. The program code could be supplied in a number of ways, such as on a memory of the dimmer circuit 11 in data communication with the microprocessor, and could be configured to be implemented by the microprocessor implementing at least part of the dimmer circuit 11.

It will be understood that there may be other variations and modifications to the configurations described herein that are also within the scope of the present invention.

The discussion of documents, acts, materials, devices, articles and the like is included in this specification solely for the purpose of providing context for the present invention. It is not suggested or represented that any of these matters formed part of the prior art base or were common general knowledge as it existed before the priority date of each claim of this application.

The invention claimed is:

1. A dimming system for controlling a load, the dimming system including: a plurality of dimmers connected in series with the load and an alternating current (AC) source, whereby each of the plurality of dimmers are connected in parallel with each other, wherein each of the plurality of dimmers has a user interface and a dimmer circuit for controlling AC to the load, and wherein
the dimmer circuit includes:
an AC switch for switching the AC to the load at a conduction angle to control the load, whereby the AC is conducted to the load in an ON state and not conducted to the load in an OFF state; and
a controller configured to:
determine the conduction angle of the load to control turn-ON at each half cycle of the AC source to control switching of the ON and OFF states of the AC switch based on at least a user control signal from the user interface indicating the conduction angle of the load;
detect a zero-crossing of the AC to the load; and
track the conduction angle of the load by detecting change in the conduction angle of the load based on the zero-crossing of the AC to the load, and
wherein if the controller of an initiating one of the plurality of dimmers determines a new conduction angle of the load based on the user control signal, the controller of the initiating one of the dimmers uses the new conduction angle,
the controller of each of the plurality of dimmers except the initiating one of the dimmers detects a change in the conduction angle of the load in response to the new conduction angle, and
the controller of each of the plurality of dimmers except the initiating one of the dimmers adopts the new conduction angle.

2. A dimming system as claimed in claim 1, wherein the controller is further configured to determine conduction periods indicative of the AC being conducted to the load and non-conduction periods indicative of the AC not being conducted to the load using the zero-crossing of the AC to the load.

3. A dimming system as claimed in claim 2, wherein the controller is further configured to track the conduction angle of the load by detecting change in the conduction angle of the load based on the conduction periods and the non-conduction periods of the AC to the load.

4. A dimming system as claimed in claim 1, wherein the controller is further configured to determine the conduction angle of the load to control turn-OFF at each half cycle of the AC source.

5. A dimming system as claimed in claim 1, to wherein the controller includes a conduction angle control circuit configured to track the conduction angle of the load.

6. A dimming system as claimed in claim 1, wherein the controller includes a timing control circuit configured to determine the conduction angle of the load.

7. A dimming system as claimed in claim 1, wherein the controller includes a zero-crossing detection circuit configured to detect the zero-crossing of the AC to the load.

8. A dimming system as claimed in claim 1, wherein if the user control signal is a ramp down command, the controller of the initiating one of the plurality of dimmers determines the new conduction angle of the load to be a decrease in conduction angle, and the controller of the initiating one of the dimmers provides a dimmer control signal to each of the plurality of dimmers except the initiating one of the dimmers.

9. A dimming system as claimed in claim 8, wherein the dimmer control signal is provided for a designated signalling period before the controller of the initiating one of the plurality of dimmers adopts the new conduction angle.

10. A dimming system as claimed in claim 9, wherein the dimmer control signal includes a momentary increase in the conduction angle of the load for the designated signalling period.

11. A dimming system as claimed in claim 10, wherein if the conduction angle of the initiating one of the dimmers is at a maximum conduction angle and the new conduction angle is a decrease, the controller of the initiating one of the dimmers momentarily increases the conduction angle of the load for the designated signalling period beyond the maximum conduction angle of the initiating one of the dimmers before adopting the new conduction angle of the load.

12. A dimming system as claimed in claim 8, wherein the controller of each of the plurality of dimmers except the initiating one of the dimmers detects the dimmer control signal and the controller of each of the plurality of dimmers except the initiating one of the dimmers turns-OFF the AC switch until the controller determines the new conduction angle caused by the initiating one of the dimmers based on the zero-crossing of the AC to the load,
and the controller of each of the plurality of dimmers except the initiating one of the dimmers adopts the new conduction angle for the respective AC switch.

13. A dimming system as claimed in claim 8, wherein the designated signalling period is between 30 ms and 300 ms.

14. A dimming system as claimed in claim 8, wherein if the user control signal is a turn-OFF dimmer command, the controller of the initiating one of the plurality of dimmers determines the new conduction angle of the load to be a decrease in conduction angle to zero, and the controller of the initiating one of the dimmers provides the dimmer control signal to each of the plurality of dimmers except the initiating one of the dimmers.

15. A dimming system as claimed in claim 1 wherein if the user control signal is a ramp up command, the controller of the initiating one of the plurality of dimmers determines the new conduction angle of the load to be an increase in conduction angle, and the controller of the initiating one of the dimmers monotonically increases the conduction angle of the load until reaching the new conduction angle.

16. A dimming system as claimed in claim 15, wherein if the controller of each of the dimmers except the initiating one of the dimmers detects the increase in the conduction angle, the controller of each of the plurality of dimmers except the initiating one of the dimmers adopts the new conduction angle.

17. A dimming system as claimed in claim 16, wherein the controller of each of the dimmers except the initiating one of the dimmers ramps up the conduction angle of the respective AC switch until substantially reaching the new conduction angle.

18. A dimming system as claimed in claim 1, wherein each of the plurality of dimmers are leading edge phase control dimmers or are trailing edge phase control dimmers.

19. A dimming system as claimed in claim 1, wherein the dimmer circuit includes a microprocessor implementing the controller.

20. A method of controlling a load connected in series with an alternating current (AC) source and a plurality of dimmers for controlling AC to the load, whereby each of the plurality of dimmers are connected in parallel with each other, the method includes:
- receiving a user control signal from an initiating one of the plurality of dimmers intending to change a conduction angle of the load to a new conduction angle;
- determining the new conduction angle of the load based on the user control signal to control turn-ON at each half cycle of the AC source;
- switching the AC to the load at the new conduction angle to control the load at the initiating one of the plurality of dimmers, whereby the AC is conducted to the load in an ON state and not conducted to the load in an OFF state;
- detecting a zero-crossing of the AC to the load;
- tracking the conduction angle of the load by detecting change in the conduction angle of the load based on the zero-crossing of the AC to the load at each of the plurality of dimmers except the initiating one of the dimmers in response to the new conduction angle; and
- adopting the new conduction angle at each of the plurality of dimmers except the initiating one of the dimmers.

21. A dimming system for controlling a load, the dimming system including:
a plurality of dimmers connected in series with the load and an alternating current (AC) source, whereby each of the plurality of dimmers are connected in parallel with each other, wherein each of the plurality of dimmers has a user interface and a dimmer circuit for controlling AC to the load, and wherein
the dimmer circuit includes:
- an AC switch for switching the AC to the load at a conduction angle to control the load, whereby the AC is conducted to the load in an ON state and not conducted to the load in an OFF state; and
- a controller configured to:
  - determine the conduction angle of the load to control turn-ON at each half cycle of the AC source to control switching of the ON and OFF states of the AC switch based on at least a user control signal from the user interface indicating the conduction angle of the load;
  - detect a zero-crossing of the AC to the load; and
  - track the conduction angle of the load by detecting change in the conduction angle of the load based on the zero-crossing of the AC to the load, and
wherein if the controller of an initiating one of the plurality of dimmers determines a new conduction angle of the load based on the user control signal, the controller of the initiating one of the dimmers uses the new conduction angle,
the controller of each of the plurality of dimmers except the initiating one of the dimmers detects a change in the conduction angle of the load in response to the new conduction angle, and
the controller of each of the plurality of dimmers except the initiating one of the dimmers turns-OFF the respective AC switch.

22. A dimming system for controlling a load, the dimming system including: a plurality of dimmers connected in series with the load and an alternating current (AC) source, whereby each of the plurality of dimmers are connected in parallel with each other, wherein each of the plurality of dimmers has a user interface and a dimmer circuit for controlling AC to the load, and wherein
the dimmer circuit includes:
- an AC switch for switching the AC to the load at a conduction angle to control the load, whereby the AC is conducted to the load in an ON state and not conducted to the load in an OFF state; and
- a controller configured to:
  - determine the conduction angle of the load to control turn-ON at each half cycle of the AC source to control switching of the ON and OFF states of the AC switch based on at least a user control signal from the user interface indicating the conduction angle of the load;
  - detect a zero-crossing of the AC to the load; and
  - track the conduction angle of the load by detecting change in the conduction angle of the load based on the zero-crossing of the AC to the load, and
wherein if the controller of an initiating one of the plurality of dimmers determines a new conduction angle of the load based on the user control signal, the controller of the initiating one of the dimmers uses the new conduction angle,
the controller of each of the plurality of dimmers except the initiating one of the dimmers detects a change in voltage at the plurality of dimmers except the initiating one of the dimmers in response to the new conduction angle, and
the controller of each of the plurality of dimmers except the initiating one of the dimmers adopts the new conduction angle.

23. A dimming system as claimed in claim 22, wherein if the user control signal is a ramp down command, the controller of the initiating one of the plurality of dimmers determines the new conduction angle of the load to be a decrease in conduction angle, and the controller of the initiating one of the dimmers provides a dimmer control signal for a designated signalling period to each of the plurality of dimmers except the initiating one of the dimmers.

24. A dimming system as claimed in claim 23, wherein the dimmer control signal includes a momentary increase in the conduction angle of the load for the designated signalling period, and the controller of each of the plurality of dimmers except the initiating one of the dimmers detects the change in voltage as a decrease in voltage at the plurality of dimmers except the initiating one of the dimmers for the designated signalling period.

25. A dimming system as claimed in claim 22, wherein if the user control signal is a ramp up command, the controller of the initiating one of the plurality of dimmers determines the new conduction angle of the load to be an increase in conduction angle, and the controller of the initiating one of the dimmers monotonically increases the conduction angle of the load until reaching the new conduction angle.

26. A dimming system as claimed in claim 25, wherein the controller of each of the dimmers except the initiating one of the dimmers detects the change in voltage as a decrease in voltage at the plurality of dimmers except the initiating one of the dimmers, and adopts the new conduction angle.

* * * * *

UNITED STATES PATENT AND TRADEMARK OFFICE
CERTIFICATE OF CORRECTION

PATENT NO. : 10,039,166 B2
APPLICATION NO. : 15/580994
DATED : July 31, 2018
INVENTOR(S) : James Vanderzon Page 1 of 1

It is certified that error appears in the above-identified patent and that said Letters Patent is hereby corrected as shown below:

In the Claims

Column 13, Line 62, Claim 5, before "wherein" delete "to"

Signed and Sealed this
Sixth Day of November, 2018

Andrei Iancu
*Director of the United States Patent and Trademark Office*